US011636501B2

(12) United States Patent
Hughes et al.

(10) Patent No.: US 11,636,501 B2
(45) Date of Patent: Apr. 25, 2023

(54) TECHNIQUES FOR DELIVERING RELEVANT NEWS ARTICLES TO USERS

(71) Applicant: Apple Inc., Cupertino, CA (US)

(72) Inventors: Dominic J. D. Hughes, Menlo Park, CA (US); Chi Wai Lau, Santa Clara, CA (US); Collin D. Ruffenach, Portland, OR (US)

(73) Assignee: Apple Inc., Cupertino, CA (US)

( * ) Notice: Subject to any disclaimer, the term of this patent is extended or adjusted under 35 U.S.C. 154(b) by 829 days.

(21) Appl. No.: 15/719,004

(22) Filed: Sep. 28, 2017

(65) Prior Publication Data

US 2018/0349934 A1    Dec. 6, 2018

Related U.S. Application Data

(60) Provisional application No. 62/514,869, filed on Jun. 4, 2017.

(51) Int. Cl.
*G06Q 30/02* (2012.01)
*G06Q 30/0204* (2023.01)

(52) U.S. Cl.
CPC ................ *G06Q 30/0204* (2013.01)

(58) Field of Classification Search
CPC .................................................. G06Q 30/0204
See application file for complete search history.

(56) References Cited

U.S. PATENT DOCUMENTS

| 8,122,020 B1 | 2/2012 | Donsbach et al. |
| 8,745,081 B2 | 6/2014 | Vadrevu et al. |
| 9,426,190 B1 | 8/2016 | McCurley et al. |
| 2011/0022595 A1 | 1/2011 | Song et al. |
| 2013/0132401 A1* | 5/2013 | Moon ................ G06F 16/951 707/748 |
| 2013/0179252 A1* | 7/2013 | Dong ................ G06F 16/954 706/45 |

(Continued)

OTHER PUBLICATIONS

Talia Lavie, Michal Sela, Ilit Oppenheim, Ohad Inbar, Joachim Meyer, User attitudes towards news content personalization, International Journal of Human-Computer Studies, vol. 68, Issue 8, SSN 1071-5819, https://doi.org/10.1016/j.ijhcs.2009.09.011. (Year: 2010).*

*Primary Examiner* — Katherine Kolosowski-Gager
(74) *Attorney, Agent, or Firm* — Dickinson Wright RLLP

(57) ABSTRACT

The embodiments set forth techniques for delivering relevant news articles to users. The techniques can involve auditioning different categories of news articles (e.g., entertainment, sports, technology, etc.) to a user to create a pleasant onboarding experience that requires minimal user input. As time progresses, affinity information for the user is gathered from various sources (e.g., news readers, web browsers, third-party applications, etc.). The affinity information can be used to (1) suggest additional categories in which the user might be interested, and (2) increase the accuracy by which subsequent news articles are delivered to the user. Additionally, feedback information about the user's interaction with the subsequent news articles can then be obtained, and various metrics associated with these news articles can be updated to reflect the user's interaction. In turn, the various updated metrics can enable these news articles to be delivered to other users in a more accurate manner.

20 Claims, 13 Drawing Sheets

(56) References Cited

U.S. PATENT DOCUMENTS

| | | | | |
|---|---|---|---|---|
| 2016/0041985 A1* | 2/2016 | Manterach | ........ | G06F 16/24578 |
| | | | | 707/727 |
| 2016/0055541 A1* | 2/2016 | Calistri-Yeh | ........ | G06F 16/9535 |
| | | | | 705/14.66 |
| 2016/0357753 A1* | 12/2016 | Beaver | .............. | G06F 16/24578 |
| 2016/0371271 A1 | 12/2016 | Bhatia et al. | | |
| 2017/0214980 A1* | 7/2017 | Nadler | ............... | H04N 21/2543 |

\* cited by examiner

210 – A News Reader 132 Initially Issues, To A Manager 112, A Request 212 For At Least One News Article 114, Where Affinity Information (e.g., User Cohorts 134 / User CTRs 136) Has Not Been Established For A User.

220 – The Manager 112 Provides, To The News Reader 132, A Response 222 That Includes A Collection Of News Articles 114 Categorized Into Benign Server Groups 122.

230 – Subsequent To Presenting The Collection Of Articles, The News Reader 132 Establishes Affinity Information For The User (e.g., User Cohorts 134 / User CTRs 136) Based On The User's Behavior Over Time.

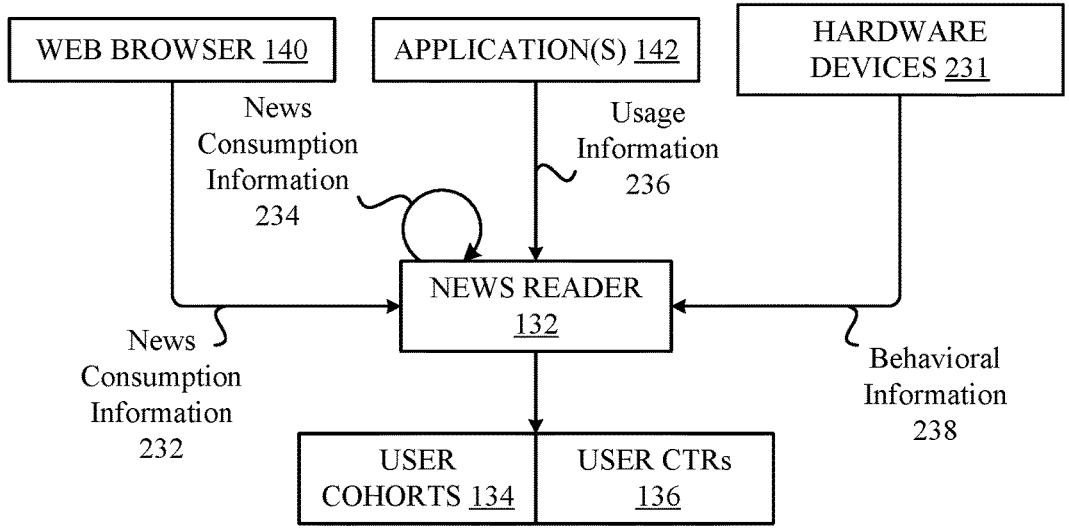

FIG. 2C

240 – The News Reader 132 Provides The Affinity Information To The Manager 112, And The Manager 112 Identifies / Responds With At Least One Suggested Group / News Articles 114 Based On The Affinity Information.

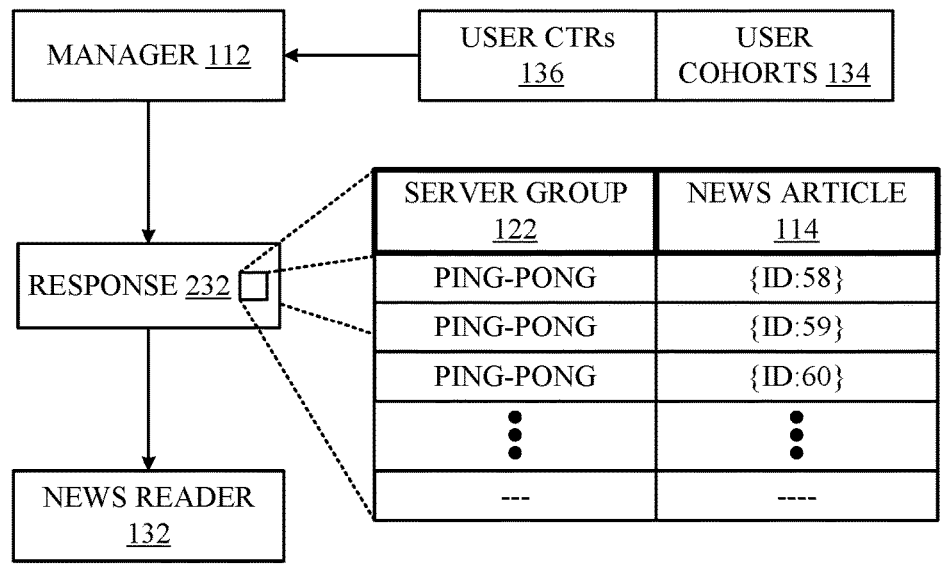

FIG. 2D

310 – A News Reader 132 Issues, To A Manager 112, A Request 302 For At Least One News Article 114, Where The Request Includes Affinity Information Associated With A User (e.g., User Cohorts 134 / User CTRs 136).

320 – The Manager 112 Generates A First Subset Of News Articles 114 Associated With Server Cohorts 116 That Align With At Least One Of The User Cohorts 134 Provided In The Request 302.

330 – The Manager 112 Calculates Correlation Strengths (e.g., Expected CTRs 332 / Cumulative CTRs 334) Between The First Subset Of News Articles 114 And The User's Affinity Information.

| NEWS ARTICLE 114-1 | | | | |
|---|---|---|---|---|
| SER. COHORTS 116-1 | SERVER CTRs 118-1 | USER CTRs 136-1 | EXPECTED CTR 332-1 | CUMULATIVE CTR 334-1 |
| AVIATION + ... | 20% | 15% | 3% | 3.8% |
| POLITICS + ... | 40% | 2% | 0.8% | |

| NEWS ARTICLE 114-2 | | | | |
|---|---|---|---|---|
| SER. COHORTS 116-2 | SERVER CTRs 118-2 | USER CTRs 136-1 | EXPECTED CTR 332-2 | CUMULATIVE CTR 334-2 |
| AVIATION + ... | 40% | 15% | 6% | 13.54% |
| POLITICS + ... | 2% | 2% | 0.04% | |
| BOEING + ... | 25% | 30% | 7.5% | |

⋮

| NEWS ARTICLE 114-N | | | | |
|---|---|---|---|---|
| ... | ... | ... | ... | ... |

*FIG. 3C*

340 – The Manager 112 Generates A Second Subset Of The News Articles 114 Based On Their Calculated Correlation Strengths (e.g., Selects The Top Two News Articles 114 Having The Highest Calculated Correlation Strengths), And Provides The Second Subset Of The News Articles 116 To The News Reader 132.

350 – The News Reader 132 Observes Interactions Performed In Association With At Least One Of The News Articles 114 In The Second Subset Of The News Articles 114 (e.g., News Article 114-2), And Updates The User Affinity Information.

360 – The News Reader 132 Provides, To The Manager 112, The Updated User Affinity Information (associated With The News Article 114-2) As Interaction Feedback 150. In Turn, The Manager 112 Updates The Server Cohorts 116 / Server CTRs 118 Associated With The News Article 114-2.

TECHNIQUES FOR DELIVERING RELEVANT NEWS ARTICLES TO USERS

CROSS-REFERENCE TO RELATED APPLICATIONS

The present application claims the benefit of U.S. Provisional Application No. 62/514,869, entitled "TECHNIQUES FOR DELIVERING RELEVANT NEWS ARTICLES TO USERS," filed Jun. 4, 2017, the content of which is incorporated herein by reference in its entirety for all purposes.

FIELD

The described embodiments relate generally to distributing news articles to users. More particularly, the described embodiments involve implementing a progressive personalization approach that requires minimal user input, yet ultimately enables relevant news articles to be distributed to users in a highly-accurate manner.

BACKGROUND

News readers enable users to view a variety of news articles that are published from different news sources. In some cases, news readers can attempt to deliver relevant content to users based on their interests. This typically involves, for example, requiring a given user to carry out an initial setup process where the user manually-selects from various news sources, topics of interests, and so on, in attempt to inform the news reader of the types of news articles that he or she prefers to read. Unfortunately, the overall tediousness of this approach often causes the user to lose interest shortly into the initial setup process, which results in the news reader knowing little (or nothing at all) about the user's interests. Moreover, even when the initial setup process is completed by the user, only coarse-granularity options are typically presented/selected by the user (to avoid frustrating him/her with too many options). In either scenario, the news reader typically can only glean high-level information about the user that provides little guidance on the user's interests. Consequently, the news reader remains largely incapable of delivering relevant news articles to the user, which degrades the user's experience and can lead to attrition.

SUMMARY

To cure the foregoing deficiencies, the representative embodiments set forth herein disclose various techniques for distributing news articles to users. More particularly, the described embodiments involve implementing a progressive personalization approach that requires minimal user input, yet ultimately enables relevant news articles to be distributed to users in a highly-accurate manner.

According to some embodiments, a method is disclosed for delivering relevant news articles to users. According to some embodiments, the method can be implemented at a server computing device, and can include a first step that involves receiving, from a client computing device, a request for at least one news article, where the request includes a plurality of user cohorts, and each user cohort of the plurality of user cohorts is associated with a user click-through-rate (CTR) metric. It is noted that the term "CTR metric" used herein does not correspond only to a user physically clicking/tapping on news articles, but instead represents the user's overall interest based on observations about the user's interaction with the news articles over time. For example, any form of user interaction with a given news article can contribute (where appropriate) to a corresponding user CTR metric. The interactions can include, for example, the amount of time a user spends reading a news article, the percentage of the news article read by the user, the scroll rate while reading the news article, the elements within the news article engaged by the user (e.g., image zooming, video playback, etc.). The interactions can also include the user's social interactions associated with the news article, e.g., posting the news article online, sharing with a specific individual, saving for later, marking as a favorite, and so on. Additionally, the interactions can be assigned different values as a form of a weight with respect to the influence they have on the user CTR metric. It is noted that the foregoing examples do not in any way represent an exhaustive list, and that any user interaction—in any nature—with the news article can contribute to the values that are assigned for the user CTR metric.

A second step can involve accessing a plurality of news articles (e.g., accessible to the server computing device), where each news article of the plurality of news articles is associated with a plurality of server cohorts, and each server cohort of the plurality of server cohorts is associated with a server CTR metric. Next, a third step involves the server computing device isolating, for each news article of the plurality of news articles, a first subset of news articles based on intersections between (1) the plurality of user cohorts, and (2) the plurality of server cohorts. Next, a fourth step involves the server computing device establishing, for each news article of the first subset of news articles, a cumulative CTR metric for the news article based on (1) the user CTR metrics, and (2) the server CTR metrics. Additionally, a fifth step involves the server computing device isolating, for each news article of the first subset of news articles, a second subset of news articles based on the cumulative CTR metrics. Finally, a sixth step involves the server computing device providing the second subset of news articles to the computing device.

Additionally, the foregoing method can involve the additional step of the server computing device receiving an update from the computing device, where the update indicates (1) a news article included in the second subset of news articles, (2) an updated user CTR metric that corresponds to a server cohort associated with the news article. Additionally, the foregoing method can involve the additional step of the server computing device updating the server CTR metric that corresponds to the server cohort in accordance with the updated user CTR metric.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2E illustrate conceptual diagrams of a manager (executing on a server computing device) auditioning different server groups to a user who is being onboarded to a news reader (executing on a client computing device), according to some embodiments.

FIGS. 3A-3F illustrate conceptual diagrams of the manager gathering a collection of news articles based on affinity information associated with a user of a news reader, and providing the collection of news articles to the news reader. Moreover, the conceptual diagrams involve the news reader gathering user interaction feedback associated with the user's interaction with at least one of the news articles, and providing the user interaction feedback to the manager for processing.

DETAILED DESCRIPTION

Figure 1:
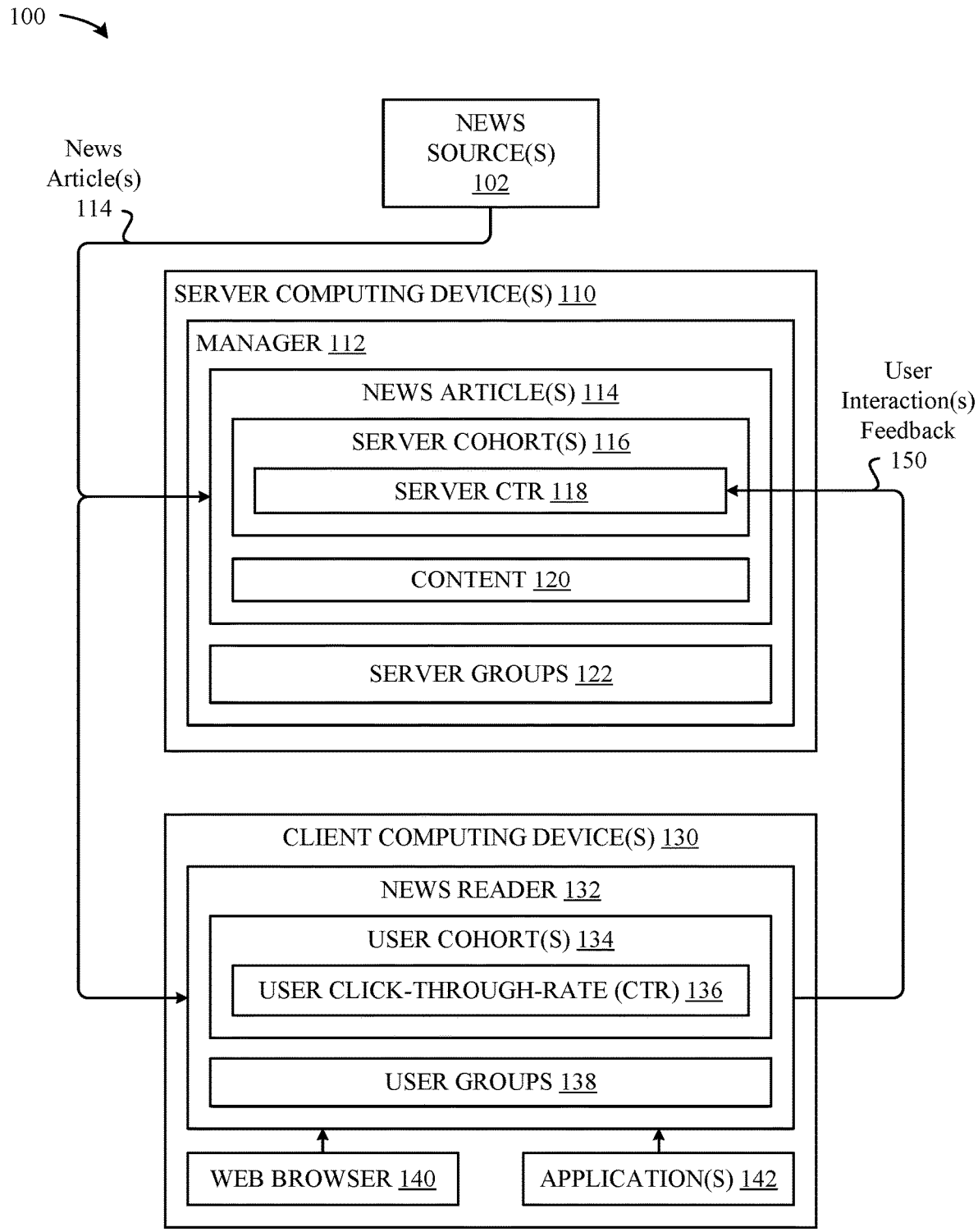
FIG. 1 illustrates a block diagram of different computing devices that can be configured to implement different aspects of the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for enabling a server computing device to deliver relevant news articles to users (via news readers executing on client computing devices). According to some embodiments, the techniques can involve, when onboarding a new user to a news reader, automatically presenting news articles that belong to different pre-selected/benign groups (also referred to herein as "categories")—e.g., entertainment, sports, technology—to create a pleasant onboarding experience that is likely to engage the user. Importantly, this approach can enable the news reader to omit the conventional setup process that requires the user to manually-select his or her interests—which, as previously described above, has proven to be an ineffective approach for obtaining an accurate understanding of the user's interests. Instead, the user can interact with the news reader in an organic matter—e.g., reading articles to his or her satisfaction—while the news reader gathers information (referred to herein as "affinity information") about the user's interests. According to some embodiments, the news reader can also interact with other software applications/hardware applications executing on the client computing device to gather additional affinity information for the user. In turn, the affinity information can be used to enable the server computing device to accurately suggest additional groups in which the user might be interested—as well as remove those groups in which the user clearly is not interested.

Additionally, the affinity information can be used to increase the overall accuracy by which relevant news articles are delivered to the user. In particular, the news reader can provide the affinity information to the server computing device in conjunction with a request to obtain a fresh collection of news articles. In turn, the server computing device can gather the collection of news articles that coincide with the affinity information, and provide the collection of news articles to the news reader. As the user engages (or ignores) the different news articles in the collection of news articles, the news reader can provide updated affinity information to the server computing device to inform the server computing device about the user's interactions with the different news articles. In turn, the server computing device can update various metrics associated with the different news articles to reflect the user's interactions. In this manner, the various updated metrics can enable the different news articles to be distributed to other users in a more accurate manner.

A more detailed discussion of these techniques is set forth below and described in conjunction with FIGS. 1, 2A-2D, and 3-6, which illustrate detailed diagrams of systems and methods that can be used to implement these techniques.

FIG. 1 illustrates a block diagram 100 of different computing devices that can be configured to implement various aspects of the techniques described herein, according to some embodiments. Specifically, FIG. 1 illustrates a high-level overview of a news source 102, a server computing device 110, and a client computing device 130. Notably, throughout this disclosure these computing devices will be discussed in the singular sense, but it is understood that any number of news sources 102, server computing devices 110, and client computing devices 130 can be configured to participate/communicate with one another in accordance with this disclosure. Additionally, although not illustrated in FIG. 1, it is understood that the various computing devices illustrated in FIG. 1 each can include at least one processor, at least one memory, and at least one storage device that collectively enable these computing devices to operate in accordance with this disclosure. For example, in a given computing device, instructions for various software components can be stored in the at least one storage device, and loaded into the at least one memory for execution by the at least one processor to enable the computing device to implement the techniques described herein. For example, a manager 112 can be configured to execute on a given server computing device 110. Moreover, a news reader 132, a web browser 140, and applications 142 can be configured to execute on a given client computing device 130. It is understood that these software components can also be split apart into different components—or merged together into fewer components—without departing from the scope of this disclosure.

As shown in FIG. 1, a news source 102 can be configured to deliver, to a server computing device 110, news articles 114 that include some form of content 120 (e.g., text, photos, videos, animations, sounds, etc.). According to some embodiments, the news source 102 can represent one or more computing devices that interface with a software service (e.g., a third-party service) that (1) gathers news articles 114 from news providers, and (2) organizes them for delivery to the server computing device 110. In another example, the news source 102 can represent one or more computing devices that are configured to directly-interface with different news providers to obtain news articles 114 for delivery to the server computing device 110. For example, the news source 102 can be configured to periodically fetch up-to-date news articles 114 from a variety of news providers and provide them to the server computing device 110. Alternatively, the news source 102 can be configured to receive push notifications regarding up-to-date news articles 114 from a variety of news providers and provide the up-to-date news articles 114 to the server computing device 110. In any case, news source 102 represents one or more entities that can provide news articles 114 to the server computing device 110 in a manner that enables the server computing device 110 to perform its own functionalities, which are described below in greater detail. It is additionally noted that the functionalities performed by the news source 102 can be implemented by the server computing device 110 if desired.

As shown in FIG. 1, the server computing device 110 can include a manager 112 that is primarily configured to enable the server computing device 110 to carry out the various techniques set forth herein. In particular, and as shown in FIG. 1, the manager 112 can access a variety of news articles 114—e.g., those provided by the news source 102—and manage different properties for the news articles 114. As described in greater detail herein, the management of the different properties for a given news article 114 can involve establishing/removing cohorts are assigned to the news article 114, which are referred to herein as server cohorts 116. For example, a news article 114 about the Federal Aviation Administration (FAA) increasing airplane maintenance frequency requirements can be assigned three different server cohorts 116: "Government," "Aviation," and "Aircraft Mechanics." In another example, a news article 114 about a professional golf player winning a tournament can be assigned two different server cohorts 116: "Sports" and "Golf." It is understood that any number of server cohorts 116 can be assigned to/removed from a news article 114 to accurately capture the true content/purpose associated with the news article 114. Additionally, it is understood that any of the server cohorts 116 can include multiple parameters, e.g., "Government+Short Article", "Sports+Images," "Aviation+Videos+Long Article," and so on.

Additionally, and as shown in FIG. 1, each server cohort 116 (for a particular news article 114) can correspond to a server "click-through-rate" (CTR) metric 118. As described in greater detail herein, a server CTR metric 118 (for a particular server cohort 116) can provide a representation of an expected/observed interest by users who have shown an affinity toward the particular server cohort 116. In particular, the server CTR metric 118 can be calculated by the manager 112 in accordance with user interactions that are expected to take place/have been observed in association with the news article 114. According to some embodiments, the user interactions can include a primary event—referred to herein as an "impression," which represents the act of displaying the news article 114 to a user (e.g., via a news reader 132, as described below). Moreover, the user interactions can include secondary events that can occur after the primary event takes place. According to some embodiments, the secondary events can include (but are not limited to) a user reading, saving, sharing, liking, etc., the news article 114. According to some embodiments, each of the secondary events can correspond to an individual value in accordance with an underlying relevance of the secondary event. For example, a user reading the news article 114 can be worth one "click," the user saving the news article 114 can be worth two clicks, and the user sharing/liking the news article 114 can be worth five clicks (each).

According to some embodiments, a server CTR metric 118 (for a server cohort 116) can be calculated by dividing (1) the estimated/observed clicks by (2) the estimated/observed impressions. Notably, when a news article 114 is first received by the manager 112—and one or more server cohorts 116 are established for the news article 114—the number of impressions/clicks (i.e., server CTR metrics 118) associated with the news article 114 will not yet be established (as the news article 114 has not been distributed to any users). To account for this deficiency, the manager 112 can initially establish artificial values for the server CTR metrics 118 in accordance with the content 120 that is included in the news article 114. For example, when the manager 112 believes that a news article 114 is strongly associated with a highly-specific server cohort 116, e.g., "Ford GT", the manager 112 can initially assign the corresponding server CTR metric 118 to a high value, e.g., "40%". In accordance with the description provided above, the server CTR metric 118 of "40%" can represent an estimate by the manager 112 that any users who show an affinity toward Ford GT automobiles will likely engage (e.g., read, save, share, like, etc.) with the news article 114 when the news article 114 is shown (i.e., displayed) to the users (e.g., via a news reader 132). For example, the server CTR metric 118 of "40%" can represent an estimate that, for every one-hundred users (who show an affinity toward Ford GT automobiles) who view the news article 114, forty of the users will end up clicking on the news article 114 to read it. However, the other secondary events described herein also account for different scenarios, e.g., for every fifty users (again, who show an affinity toward Ford Automobiles) who view the news article 114, twenty of the users will share the news article with a friend.

Accordingly, the manager 112 can establish/assign different server cohorts 116/server CTR metrics 118 to news articles 114 to establish initial estimates about the different cohorts that are covered by the news articles 114. It is noted that the manager 112 can implement a variety of techniques to enhance the accuracy by which the different server cohorts 116/server CTR metrics 118 are assigned to the news articles 114. For example, when processing a news article 114, the manager 112 can implement any technique (e.g., machine learning) for analyzing the direct aspects of the news article 114, including a news source associated with the news article 114, the content 120 included in the news article 114, and so on. For example, the manager 112 can automatically assign the server cohort 116 "Sports" upon determining that the news article 114 is published by a sports news entity (e.g., ESPN). In another example, the manager 112 can process the content 120 of the news article 114 (e.g., words, word patterns, links, photographs, videos, sounds, animations, etc.) to effectively identify different server cohorts 116 that should be assigned to the news article 114. In yet another example, the manager 112 can consider origination aspects associated with the news article 114. For example, the manager 112 can identify one or more locales (e.g., of authors, commenters, etc.,) to which the news article 114 corresponds, and correspondingly apply server cohorts 116/server CTR metrics 118 in accordance with the one or more locales.

Additionally, the manager 112 can consider indirect aspects of the news article 114 when processing the news article 114 prior to its distribution. For example, the manager 112 can compare the news article 114 against previously-distributed news articles 114 (that have been exposed to users) to increase the accuracy by which the server cohorts 116/server CTR metrics 118 are established for the news article 114. For example, the manager 112 can identify that the news article 114 is a follow-up news article 114 to at least one new article 114 that was previously-distributed users. In another example, the manager 112 can identify that the content 120 of the news article 114 substantially overlaps the content 120 of a previously-distributed news article 114. In any case, it is noted that the server cohorts 116/server CTR metrics 118 associated with the previously-distributed news articles 114 are likely to be highly accurate as they have been dynamically adjusted by the manager 112 to reflect user interaction feedback 150 (which is described below in greater detail). In this regard, the manager 112 can exploit the server cohorts 116/server CTR metrics 118 of previous-distributed news articles 114 to increase the accuracy by which the manager 112 establishes the server cohorts 116/server CTR metrics 118 for incoming news articles 114.

As noted above, the manager 112 can be configured to receive, from a client computing device 130, user interaction feedback 150 for a given news article 114—e.g., a news article 114 that is read by a user at the client computing device 130. In turn, the manager 112 can process the user interaction feedback 150 to dynamically modify the server cohorts 116/server CTR metrics 118 associated with the news article 114 to increase the overall accuracy by which the news article 114 is subsequently distributed to future users. To implement this approach, the client computing device 130 can include a news reader 132 that is configured to (1) receive news articles 114 (from the server computing device 110), (2) present the news articles 114 to the user (e.g., via a display device included on the client computing device 130), and (3) gather information about the user's interaction with the news articles 114. For example, the news reader 132 can provide an indication to the manager 112 each time an impression event takes place for a news article 114—which, can merely involve the user encountering the news article 114 in a news feed displayed by the news reader 132. Moreover, the news reader 132 can provide an indication to the manager 112 each time the user engages with a news article 114 (e.g., reads, saves, shares, likes, etc.).

According to some embodiments, the user interaction feedback 150 can include information that can be specifically linked to the server cohorts 116/server CTR metrics 118 to enable the manager 112 to update the server cohorts 116/server CTR metrics 118 as appropriate. In particular, and as shown in FIG. 1, the information can include user cohorts 134/user "click-through-rate" (CTR) metrics 136, which are aligned with the server cohorts 116/server CTR metrics 118. However, unlike the server cohorts 116/server CTR metrics 118—which specifically correspond to a given news article 114—the user cohorts 134/user CTR metrics 136 represent the behavioral aspects of a given user observed by the news reader 132 over time. For example, a user who shows an affinity (e.g., through interactions with news articles 114) towards Porsche and Maserati sports cars can be assigned the user cohorts 134 "Porsche" and "Maserati". Moreover, the strength of the user's affinity toward these sports cars can be represented by the user CTR metrics 136 that correspond to the user cohorts 134. For example, the user CTR metric 136 for the user cohort 134 "Porsche" can take the value of "50%" to show that the user has a strong affinity toward articles related to Porsche automobiles, and the user CTR metric 136 for the user cohort 134 "Maserati" can take the value of "15%" to show that the user has a mild affinity toward articles related to Maserati automobiles.

As described in greater detail herein, the user interaction feedback 150 can be utilized in a variety of manners by the manager 112 to improve the overall accuracy by which news articles 114 are delivered to the news readers 132. For example, when a news reader 132 issues a request for the most recent news articles 114, the news reader 132 can include the user cohorts 134/user CTR metrics 136 in the request to enable the manager 112 to identify a collection of news articles 114 that most strongly coincide with the affinities of the user associated with the news reader 132. A more detailed description of this identification technique is provided below in conjunction with FIGS. 3A-3D. In another example, and as described herein, the manager 112 can utilize the user interaction feedback 150 to update the server cohorts 116/server CTR metrics 118 to reflect the user's actual interactions with the news articles 114. For example, a news article 114 originally tagged with the server cohort 116 "Fishing"—along with a corresponding, high-valued server CTR metric 118—can be adjusted after received user interaction feedback 150 indicates that a majority of users with strong affinities toward fishing did not engage with the news article 114 in a meaningful manner (e.g., few bothered to read the news article 114 upon encountering it). This can occur, for example, when the content 120 of a news article 114 is incorrectly interpreted by the manager 112 and results in the assignment of inaccurate server cohorts 116/server CTR metrics 118 to the news article 114. A more detailed description of this update technique is provided below in conjunction with FIGS. 3E-3F.

Additionally, as shown in FIG. 1, the manager 112 can manage various server groups 122, while the news reader 132 can manage various user groups 138. As described in greater detail herein, the server groups 122 can represent different categories into which the news articles 114 can be included (e.g., based on their associated server cohorts 116). For example, the server group 122 "Top Stories" can be configured to include a variety of news articles 114 that are primarily based on their popularity. In another example, the server group 122 "Sports" can be related to any news articles 114 that are associated with server cohorts 116 that are considered to be related to sports, e.g., the server cohorts 116 "Basketball," "Golf," "Tennis,"— and even the more generic server cohort 116 "Sports" itself. Additionally, the user groups 138 for a given news reader 132 can represent different categories of news articles 114 to which a user of the news reader 132 has shown an affinity. In particular, the user groups 138 can be (1) provided (e.g., via user interaction feedback 150) to the manager 112 to indicate groups of interest, and (2) utilized by the news reader 132 to categorize (i.e., group) the news articles 114 within a news feed displayed within the news reader 132.

As described in greater detail herein, the manager 112 can be configured to implement a progressive personalization approach for new users for which user cohorts 134/user CTR metrics 136 and user groups 138 have not yet been established. For example, the manager 112 can be configured to audition a particular subset of the server groups 122 whose associated news articles 114 are considered to be benign (i.e., non-polarizing) in nature, e.g., groups related to sports, entertainment, and technology. In this manner, a new user of a news reader 132 is more likely to engage with the news reader 132 when they are presented with news articles 114 that are light-hearted in nature and are likely to peak the user's interests. Additionally, the manager 112 can identify server groups 122 that can be suggested to the new user as the news reader 132/manager 112 observe the new user's behavior over time. For example, the manager 112 can identify (e.g., through user interaction feedback 150) that the new user exhibits an affinity toward motocross, and recommend the establishment of a user group 138 into which motocross-related news articles 114 can be categorized.

Moreover, the manager 112 can identify when a threshold number of users show an interest in a user group 138 that is not included in the server groups 122, and add the user group 138 to the server groups 122 to improve the overall effectiveness of news article 114 delivery. A more detailed breakdown of the server group 122/user group 138 techniques is provided below in conjunction with FIGS. 2A-2D.

Additionally, a news reader 132 can be configured to gather valuable information about a user from other applications that can execute alongside of the news reader 132 on a given client computing device 130. For example, as illustrated in FIG. 1, the client computing device 130 can include a web browser 140 with which the news reader 132 can be configured interact. According to some embodiments, the news reader 132 can be configured to interact with the web browser 140 in a secure manner to enhance the understanding of the user's affinities while protecting the user's privacy. For example, the web browser 140 can be configured to hash uniform resource locators (URLs) of news websites that are visited by the user using the web browser 140, and compare the hashed URLs against a master list of hashed news website URLs to identify and/or better-understand the user's affinities. Continuing with this example, various depth levels of the URLs can be processed to identify when the user has a stronger affinity toward a cohort that might not be readily apparent when analyzing only the base URL. For example, the news reader 132 might identify that a user exhibits a general affinity toward sports upon identifying that the user frequently visits/spends time browsing "http://www.ESPN.com/ . . . /". However, the news reader 132 might further identify, based on processing query strings, directory paths, etc., of the URL, that the URL "http://www.ESPN.com/Basketball" is accessed over 75% of the time the user visits the website. In this regard, the news reader 132 can establish the user cohorts 134 "Sports" and "Basketball", and assign a higher user CTR metric 136 to the user cohort 134 "Basketball" (in comparison to the user CTR metric 136 assigned to the user cohort 134 "Sports").

Additionally, the news reader 132 can configured to consider information about one or more applications 142 that execute on the client computing device 130. For example, the applications 142 can include native/third party applications whose purposes can be correlated to user's affinities. For example, the news reader 132 can identify that a frequently-utilized application 142 is an official "App" for a National Basketball Association (NBA) sports team (e.g., based on a developer domain associated with the application 142), and, in turn, identify that the user has a strong affinity toward that sports team. In another example, the news reader 132 can identify that a frequently-utilized application 142 is a fantasy football "App", and, in turn, identify that the user has a strong affinity toward football. In yet another example, the news reader 132 can identify that a frequently-utilized application 142 is a fitness tracking "App", and, in turn, identify that the user has a strong affinity toward personal fitness.

Additionally, the news reader 132 can be configured to interact with any hardware/software components available on the computing device to glean information about the user's affinities. For example, the news reader 132 can, at the sole discretion of the user, interface with accelerometer components, Global Positioning System (GPS) components, clock components, camera components, microphone components, and so on. For example, the news reader 132 can identify, based on information obtained from the accelerometer components, that the user is an avid runner who might be interested in sports-related news articles 114. In another example, the news reader 132 can identify, based on information received from the GPS components, that the user is located in an unusual area (e.g., the user is vacationing), and may prefer to see at least one news article 114 associated with the user's location. It is understood that the foregoing components/examples do not in any way represent an exhaustive list. On the contrary, the various software/hardware components described herein can be configured to interface with one another in any manner to enable user affinities to be accurately identified.

Accordingly, FIG. 1 sets forth an overview of different components/entities that can be included in the news source 102, server computing device 110, and client computing device 130 to enable the embodiments described herein to be properly implemented. As described in greater detail below in conjunction with FIGS. 2A-2E, 3A-3F, and 4A-4B, these components/entities can be utilized to improve the manner in which news articles 114 are delivered to users.

Figure 2A:
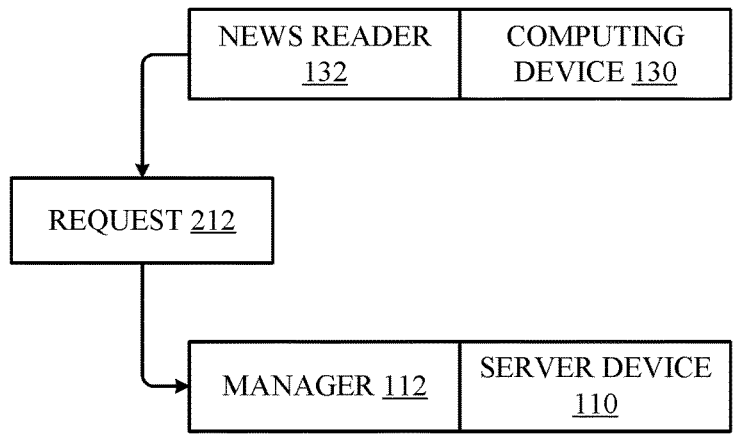
Figure 2B:
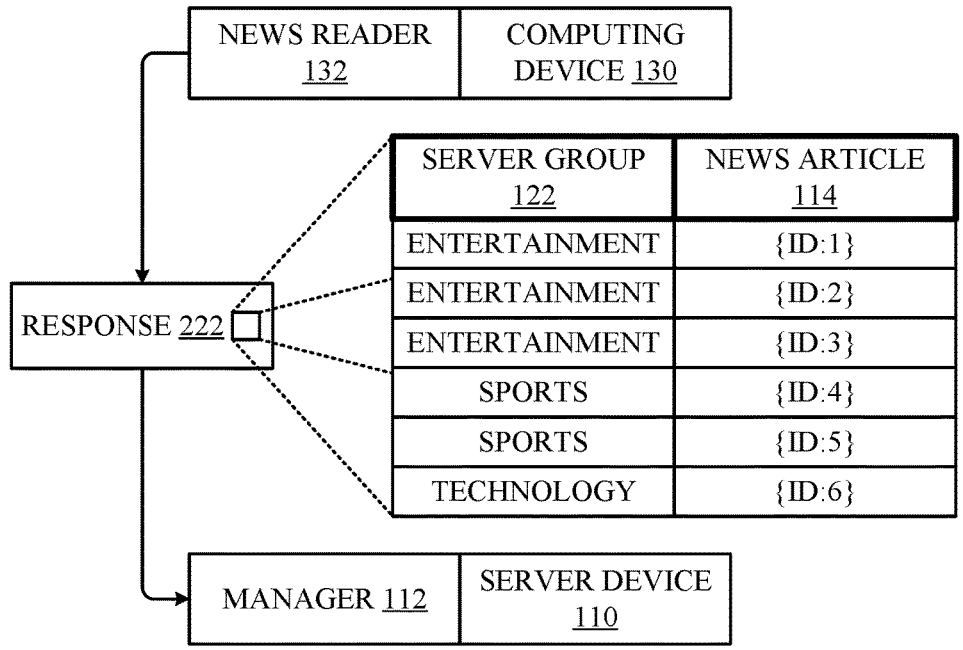

FIGS. 2A-2E illustrate conceptual diagrams of the manager 112 auditioning different server groups 122 to a user who is being onboarded to a news reader 132, according to some embodiments. In particular, the various steps that take place throughout FIG. 2A-2E can be implemented in lieu of requiring a user to manually-select from a variety of news sources, cohorts, etc., in which he or she is interested—which, as noted herein, has proven to be an ineffective approach. As shown in FIG. 2A, a first step 210 can involve the news reader 132 initially issuing, to the manager 112, a request 212 for at least one news article 114. In particular, the request 212 can be sent by the news reader 132 upon identifying that no (or little) affinity information has been established for the user. As shown in FIG. 2B, a second step 220 can involve the manager 112 providing, to the news reader 132, a response 222 that includes a collection of news articles 114 that are categorized into benign server groups 122. For example, as shown in FIG. 2B, the collection of news articles 114 can include six different news articles 114: three related to an "Entertainment" server group 122, two related to a "Sports" server group 122, and one related to a "Technology" server group 122.

According to some embodiments, the server groups 122 illustrated in FIG. 2B can be pre-selected based on a set of rules that are implemented by the manager 112. For example, the manager 112 can be configured to provide the news articles 114 associated with the top three most popular server groups 122, and then provide additional news articles 114 as the user reads beyond the news articles 114. In another example, the manager 112 can be configured to analyze basic information about the user in attempt to audition server groups 122/news articles 114 that are more specific than the pre-selected groups described above. For example, the manager 112 can determine that users disposed in a particular geographic region exhibit a stronger affinity toward particular server groups 122, and conduct the onboarding process by delivering news articles 114 associated with at least one of the particular server groups 122. For example, the manager 112 can deliver news articles 114 related to a "Computing" server group 122 to a user upon determining that the user is disposed within the geographical area of Silicon Valley in California. In another example, the manager 112 can deliver news articles related to a "Wine" server group 122 to a user upon determining that the user is disposed within the geographical area of Napa Valley or Sonoma Valley in California.

In any case, a third step 230 illustrated in FIG. 2C can involve the news reader 132 presenting the collection of news articles 114 to the user (e.g., via a news feed displayed within the news reader 132). In turn, the news reader 132 can gather affinity information (i.e., user cohorts 134/user CTR metrics 136) for the user as he or she interacts with the collection of news articles 114 within the news reader 132. Moreover, and as previously described above, the news reader 132 can also gather affinity information for the user based on additional sources, e.g., a web browser 140, applications 142, hardware devices 231, and so on. For example, as shown in FIG. 2C, the news reader 132 can obtain news consumption information 232, 234 from the web browser 140 and news reader 132, respectively. Moreover, the news reader 132 can obtain usage information 236 from the applications 142 (as described herein). Moreover, the news reader 132 can obtain behavioral information 238 (e.g., accelerometer information, location information, etc.) from the hardware devices 231. Again, establishing the affinity information for the user can involve establishing user cohorts 134 and corresponding user CTR metrics 136 in accordance with the user's behavior. For example, if the news reader 132 observes (e.g., using any of the aforementioned approaches) that the user reads, saves, likes, and/or shares 50% of every golf news article 114 that he or she encounters, then the news reader 132 can establish a user cohort 134 "Golf" and a corresponding user CTR metric 136 "50%". Additionally, and as described in greater detail below in conjunction with FIG. 2D, establishing the affinity information for the user can also involve the news reader 132/manager 112 identifying additional server groups 122 in which the user might be interested.

As shown in FIG. 2D, a fourth step 240 can involve the news reader 132 providing the affinity information (gathered over time in conjunction with step 230) to the manager 112. According to some embodiments, the news reader 132 can be configured to provide the affinity information when one or more conditions are met. For example, the news reader 132 can identify a point at which at least three user cohorts 134 have been identified, which indicates at least a basic knowledge about the user's affinities. In another example, the news reader 132 can identify a time threshold that is satisfied, e.g., after the user actively utilizes the news reader 132 for at least ten minutes. It is noted that any conditions can be implemented by the news reader 132 to effectively cause the news reader 132 to provide the affinity information to the manager 112 at appropriate times.

Additionally, as shown in FIG. 2D, step 240 can involve the manager 112 analyzing the affinity information, and identifying at least one server group 122—"Ping-Pong"—that should be recommended to the user. Although not illustrated in FIG. 2D, the step 240 can also involve the manager 112 identifying that the user has shown little or no interest at least one of the initial server groups 122 (described above in conjunction with step 210), and automatically prevent news articles 114 associated with this initial server group 122 from being further distributed to the news reader 132. Additionally, it is noted that the manager 112 can identify when a threshold number of users appear to be interested in a user group 138 (e.g., "Ping-Pong") that has not yet been added to the server groups 122, and automatically incorporate the user group 138 as a new entry into the server groups 122. In this manner, the manager 112 can establish/eliminate different server groups 122 to dynamically adjust to the collective interests of users that are observed as they interact with the news articles 114, which is described below in greater detail in conjunction with FIG. 2E.

Figure 2E:
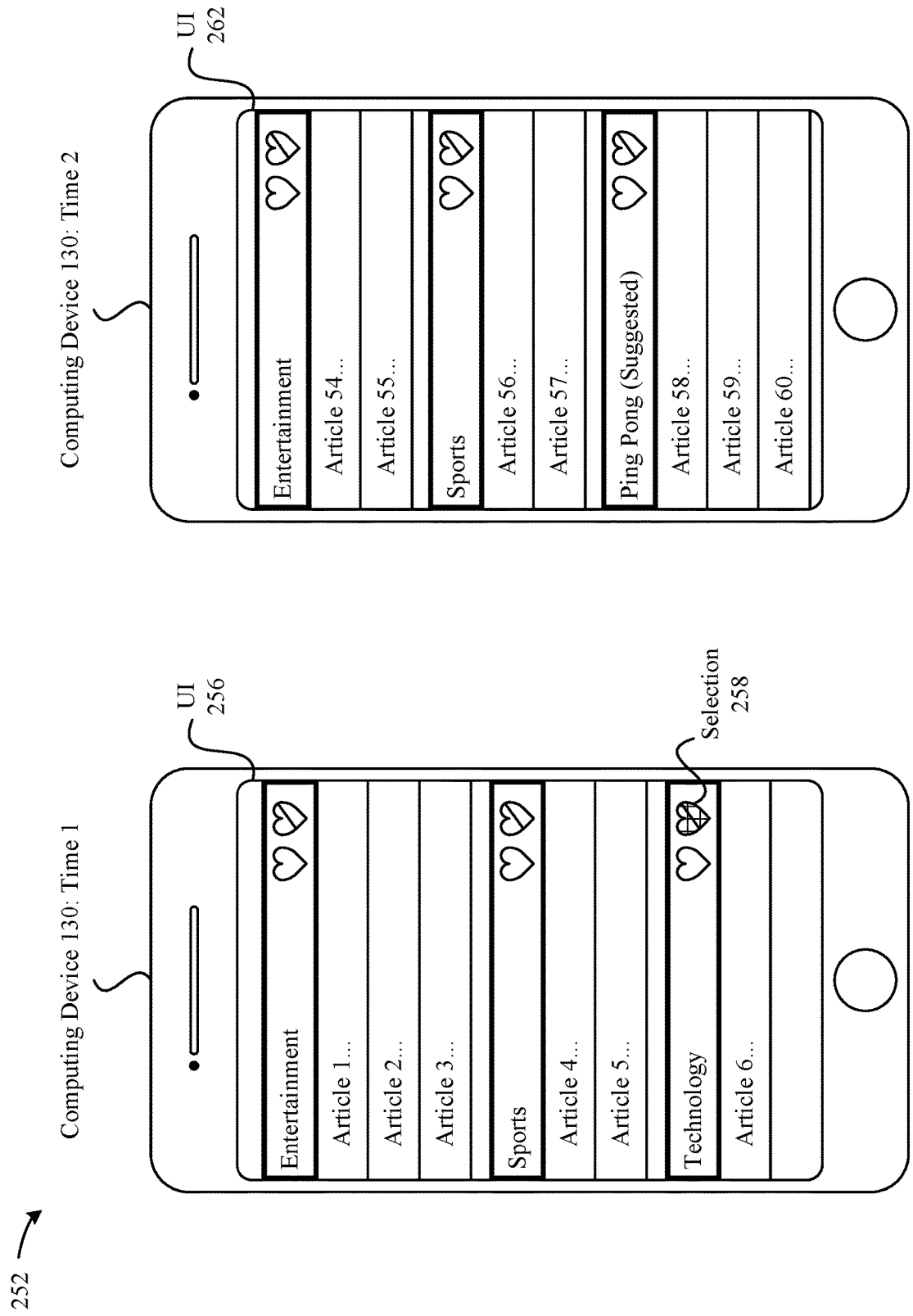

FIG. 2E illustrates a conceptual diagram 252 of example user interfaces of the news reader 132 that represent the various steps described above in conjunction with FIGS. 2A-2D, according to some embodiments. In particular, the news reader 132 can, at a first time, display a user interface (UI) 256 that represents the conclusion of step 210 described above in conjunction with FIG. 2A. Again, this can involve the news reader 132 receiving a collection of news articles 114 that at least includes six different news articles 114: three news articles 114 related an "Entertainment" server group 122, two news articles 114 related to a "Sports" server group 122, and one news article 114 related to a "Technology" server group 122. As shown in FIG. 2E, each server group 122 can include heart-shaped icons that enable the user to manually indicate his or her disinterest in server groups 122 that are presented by default, suggested to, and/or manually chosen by the user. For example, a selection 258 can be made by the user to indicate his or her disinterest in the server group 122 "Technology", which will be reflected in the affinity information for the user. In turn, the affinity information, when provided to the manager 112, will prevent the manager 112 from delivering news articles 114 that otherwise would be displayed under the "Technology" heading.

Additionally, the client computing device 130 can, at a second time, display a UI 262 that represents the conclusion of step 240 described above in conjunction with FIG. 2D. In accordance with FIG. 2D, this can involve the news reader 132 receiving a collection of news articles 114 that at least includes three news articles 114 related to the "Ping-Pong" group. As also shown in the UI 262, the user's desire to no longer see the server group 122 "Technology" has been reflected by the manager 112/news reader 132. It is noted that the UIs 256, 262 illustrated in FIG. 2E are merely exemplary and that any UI can be implemented by the news reader 132 to provide the same or similar functionality. For example, the news reader 132 can present the news articles 114/server groups 122 according to different layouts, include finer-level granularity feedback UI elements (e.g., like, neutral, dislike), and so on.

Accordingly, FIGS. 2A-2E set forth an example scenario in which the manager 112 and news reader 132 can work together to audition different server groups 122 to a user in a pleasant and seamless manner that substantially minimizes the amount of user input that would otherwise be required from the user according to conventional approaches. In this manner, the news reader 132 can gather affinity information associated with the user, and provide it to the manager 112 for processing, whereupon the manager 112 can modify the server groups 122/user groups 138 (as described herein) to increase the accuracy by which relevant news articles 114 are delivered to users.

Figure 3A:
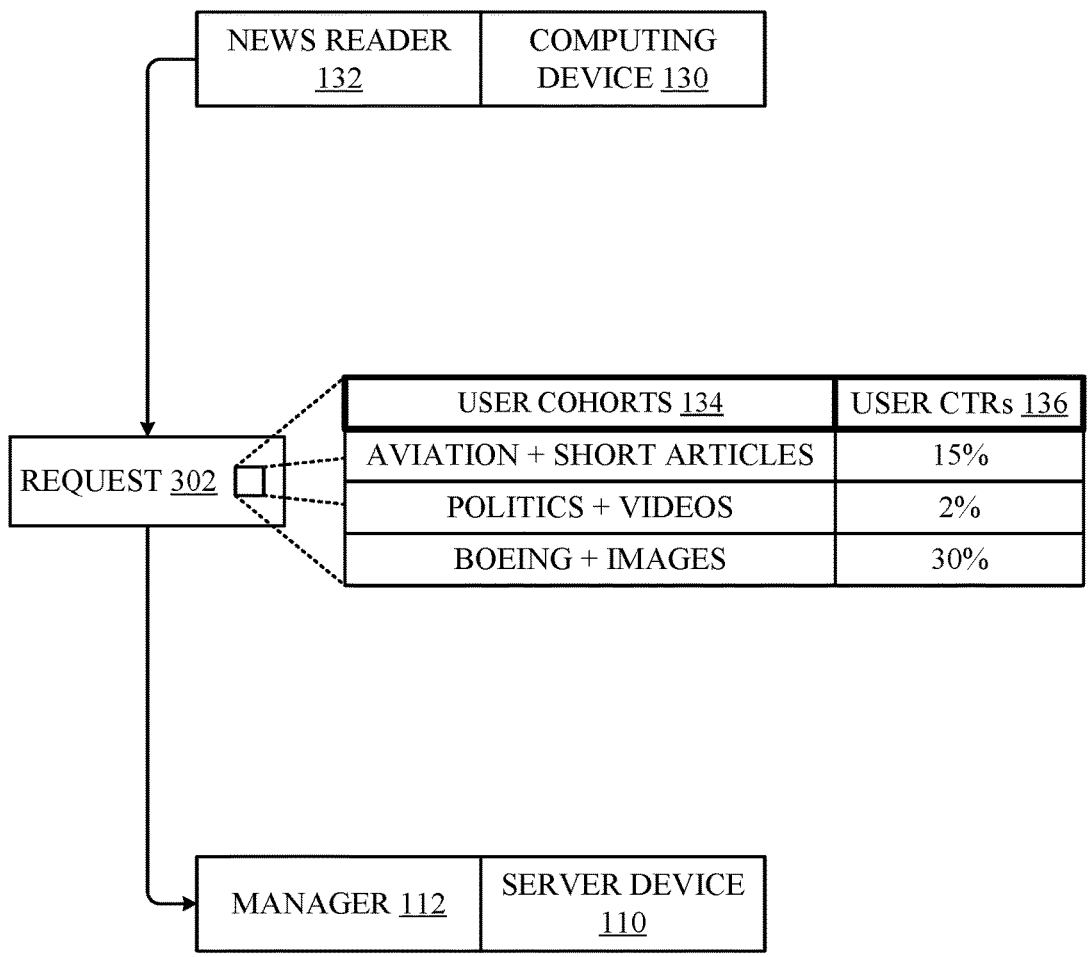
Figure 3B:
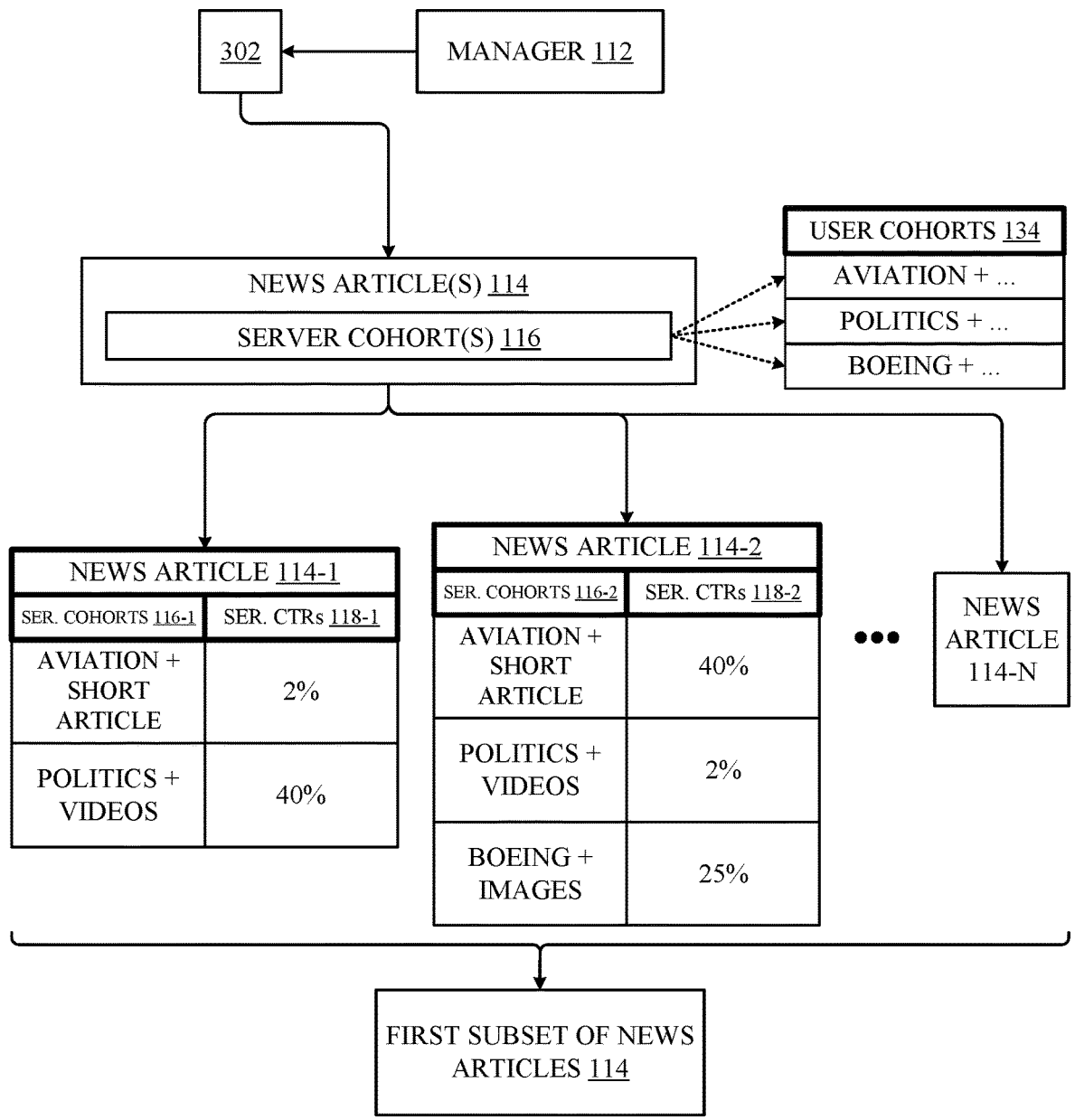
Figure 3D:
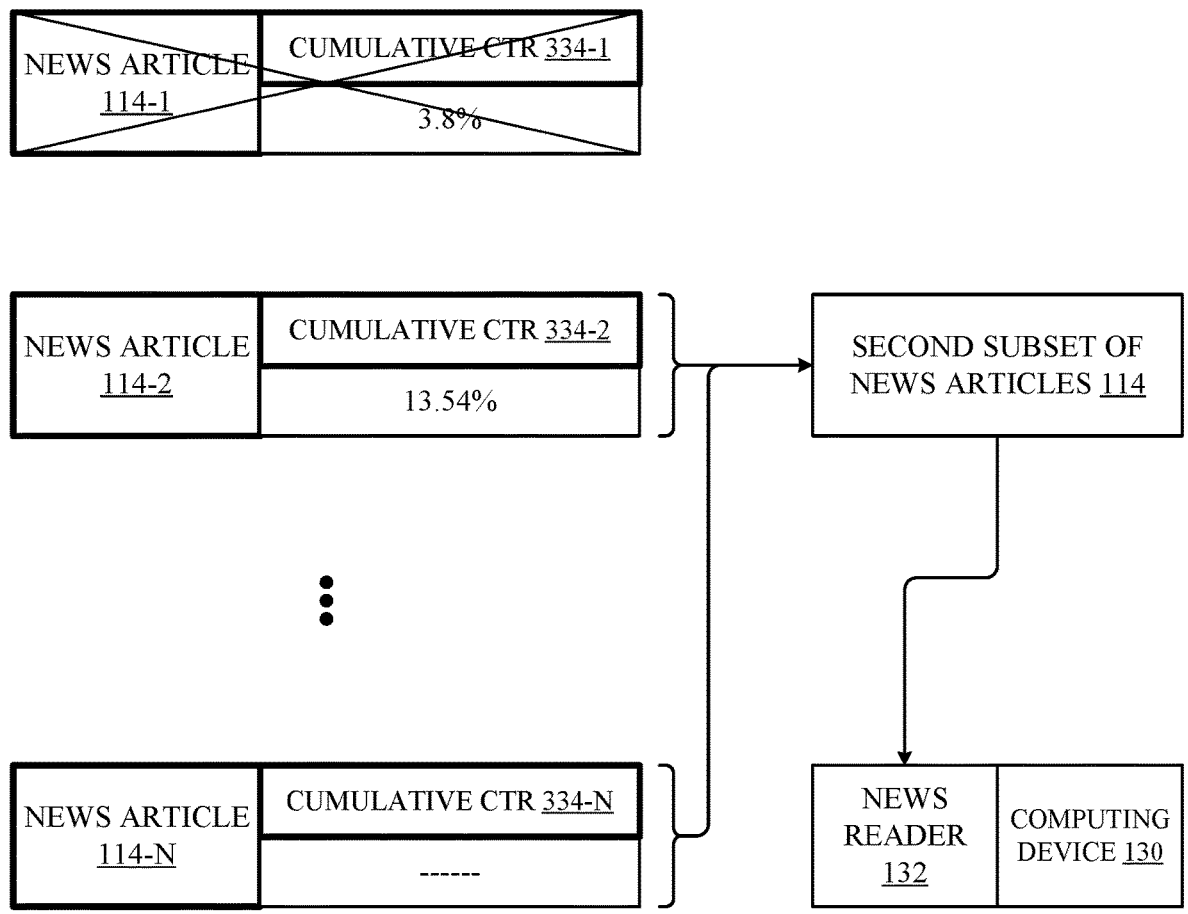
Figure 3E:
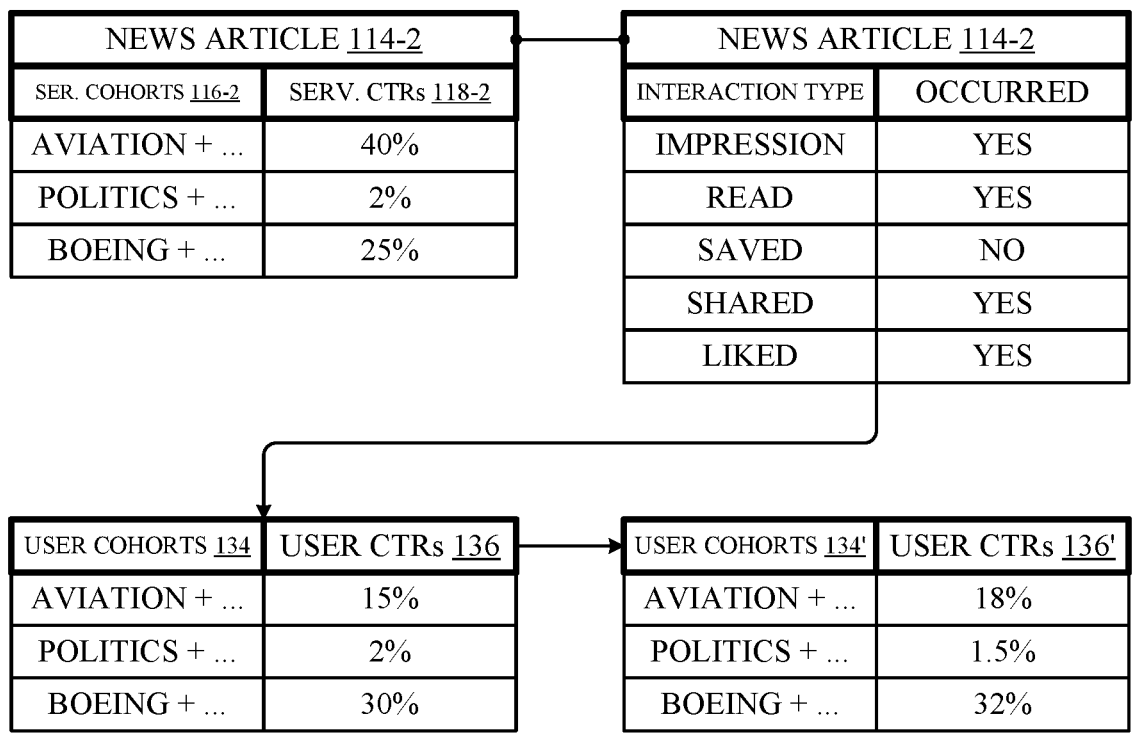
Figure 3F:
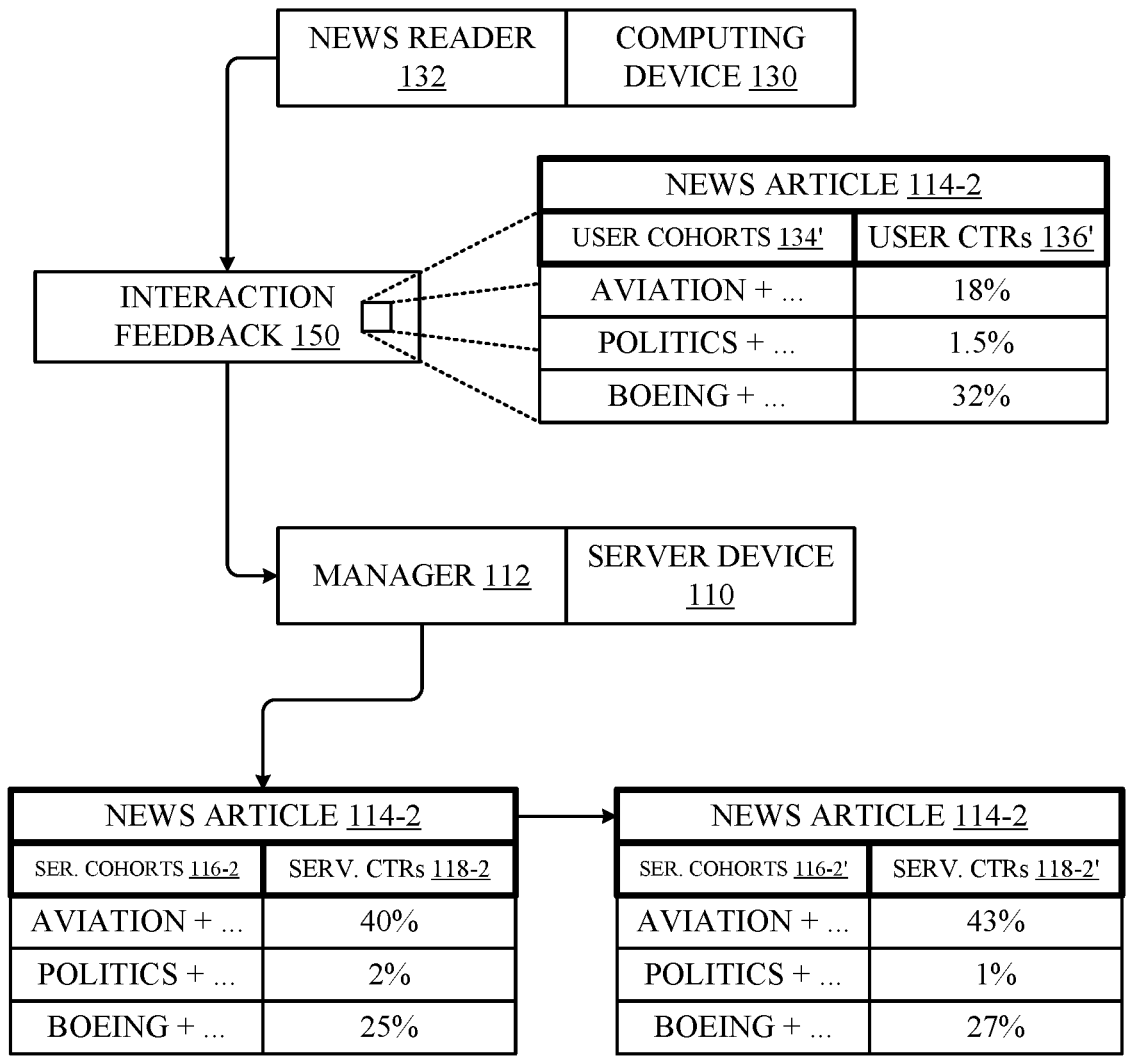

FIGS. 3A-3F illustrate conceptual diagrams of the manager 112 gathering a collection of news articles 114 based on affinity information associated with a user of a news reader 132, and providing the collection of news articles 114 to the news reader 132. Moreover, FIGS. 3E-3F illustrate the news reader 132 gathering user interaction feedback 150 associated with the user's interaction with at least one of the news articles 114, and providing the user interaction feedback 150 to the manager 112 for processing. As shown in FIG. 3A, a first step 310 involves the news reader 132 issuing, to the manager 112, a request 302 for at least one news article 114, where the request includes affinity information associated with the user (e.g., user cohorts 134/user CTR metrics 136). Step 310 can occur, for example, after the news reader 132 has observed the user's behavior over a period time (in which the user cohorts 134/user CTR metrics 136 are established), and identifies that fresh news articles 114 should be loaded into a news feed managed by the news reader 132. The identification can occur, for example, when the user loads the news reader 132 after some period of time, when the user manually requests an update (e.g., by invoking a rubber-band UI effect within the news reader 132), and so on.

As shown in FIG. 3A, the request 302 can include three different user cohorts 134: "Aviation+Short Articles," "Politics+Videos," and "Boeing+Images". It is noted that the user cohorts 134 described herein are merely exemplary and not meant to be limiting in any manner. For example, the different user cohorts 134 can include any combination of parameters based on user affinities that are established over time (e.g., "Short Articles+Cars+Images+Videos"). Additionally, it is noted that any logical operators can be used to form the different user cohorts 134, e.g., "Short Articles+ (Cars/Boats)". It is also noted that the individual user cohorts 134 described herein can be grouped together to form the more complex (i.e., multi-parameter) cohorts 134.

In any case, as shown in FIG. 3A, the user cohort 134 "Aviation+Short Articles" corresponds to a user CTR metric 136 "15%", the user cohort 134 "Politics+Videos" corresponds to a user CTR metric 136 "2%", and the user cohort 134 "Boeing+Images" corresponds to a user CTR metric 136 "30%". In this example, the different user cohorts 134/user CTR metrics 136 indicate that the user has an interest in short articles about general aviation, virtually no interest in politics—especially videos about politics—and a strong interest in Boeing news that includes images. It is noted that the different user cohorts 134 illustrated in FIG. 3A can represent only a subset of the user cohorts 134 associated with the user. For example, the subset of the user cohorts 134 can be based on a particular type of news articles 114/user groups 138 that the user is currently interested in viewing. It is further noted that the different user cohorts 134/user CTR metrics 136 illustrated in FIG. 3A are merely exemplary, and that the request 302 can be modified to include any number of user cohorts 134 (with any number of parameters)/user CTR metrics 136 in accordance with the desired news articles 114 that the news reader 132 is seeking to obtain. For example, the request 302 can include a complete set of the user cohorts 134/user CTR metrics 136 when the news reader 132 is tasked with obtaining a complete update of relevant news articles 114.

Next, in FIG. 3B, a second step 320 can involve the manager 112 generating a first subset of news articles 114 that are associated with server cohorts 116 that align with at least one of the user cohorts 134 provided in the request 302. As shown in FIG. 3B, this can involve the manager 112 identifying at least two news articles 114-1 and 114-2 whose server cohorts 116 overlap, to at least a threshold degree, with at least one of the user cohorts 134. It is noted that the manager 112 can implement any set of rules to enable strong correlations to be identified between the user cohorts 134 and the server cohorts 116 (of the available news articles 114). For example, the manager 112 can enforce a policy in which selected news articles 114 are required to have at least two server cohorts 116 that overlap with the user cohorts 134. In another example, the manager 112 can identify server cohorts 116 that might not specifically match the user cohorts 134, but still should be included. For example, the user cohort 134 "Boeing+Images," in some cases, can be correlated by the manager 112 to the server cohort 116 "Airbus+Images," as these two companies operate in a similar space and the user might be interested in Airbus-related news articles 114 that include images as well. In any case, as shown in FIG. 3B, the news article 114-1 can be short in length, include one or more videos, and be related to aviation and politics, which is represented by the two server cohorts 116-1/server CTR metrics 118-1 illustrated in FIG. 3B. Again, it is noted that any number of server cohorts 116 can be used to represent the foregoing aspects of the news article 114-1. Additionally, the news article 114-2 can be short in length, include one or more videos, one or more images, and be related to aviation, politics, and Boeing, which is represented by the three server cohorts 116-2/server CTR metrics 118-2 illustrated in FIG. 3B. It is noted that additional news articles 114 can be included in the first subset of news articles 114 that is established by the manager 112, and that they are omitted from FIG. 3B for simplification purposes.

Next, at FIG. 3C, a third step 330 can involve the manager 112 calculating correlation strengths—illustrated in FIG. 3C as expected CTR metrics 332 and cumulative CTR metrics 334—to identify, within the first subset of news articles 114, the news articles 114 that most strongly correlate to the user's affinity information. For example, as shown in FIG. 3C, expected CTR metrics 332-1 can be calculated for the news article 114-1 based on (1) the corresponding server CTR metrics 118-1, and (2) the corresponding user CTR metrics 136-1. Establishing the expected CTR metrics 332-1 can involve, for example, multiplying each server CTR metric 118-1 by its respective user CTR metric 136-1 to produce the results (e.g., "3%" and "0.8%" illustrated in FIG. 3C). It is noted that this approach is merely exemplary, and that the manager 112 can be configured to perform any number/form of mathematical operations involving the server CTR metrics 118/user CTR metrics 136—and other metrics if desired—to produce the expected CTR metrics 332. As further shown in FIG. 3C, establishing the cumulative CTR metrics 334-1 for the news article 114-1 can involve adding together all of the expected CTR metrics 332-1 after they are calculated. For example, for the news article 114-1, the cumulative CTR metric 334-1 is assigned the value of 3.8%, which essentially represents a low likelihood that the user will engage with the news article 114-1 when it is provided to the news reader 132.

Additionally, as shown in FIG. 3C, the cumulative CTR metric 334-2 for the news article 114-2 is assigned the value 13.54% (based on the techniques described above), which represents a moderate likelihood that the user will engage with the news article 114-2 when it is provided to the news reader 132. Additionally, as shown in FIG. 3C, the cumulative CTR metrics 334 for the additional news articles 114 can be calculated in the same manner as described herein. In this manner, at the conclusion of step 330, cumulative CTR metrics 334 have been calculated for all of the news articles 114 included in the first subset of news articles 114, and can now be filtered by the manager 112 to identify the strongest (i.e., most relevant) news articles 114 that should be delivered to the user.

Accordingly, in FIG. 3D, a step 340 takes place in which the manager 112 generates a second subset of the news articles 114 based on their respective correlation strengths— e.g., cumulative CTR metrics 334—calculated at step 330, as described above in conjunction with FIG. 3C. According to some embodiments, the manager 112 can be configured to identify the news articles 114 that possess the strongest cumulative CTR metrics 334, and apply any number of approaches/rules when performing the identification. For example, when a cutoff for the number of news articles 114 to be delivered to the user is required (e.g., three news articles 114), the manager 112 can identify the top three news articles 114 that have the strongest cumulative CTR metrics 334. In another example, the manager 112 can apply a cumulative CTR metric 334 value cutoff to ensure that all of the news articles 114 delivered to the news reader 132 are estimated to be at least moderately relevant. For example, the manager 112 can disregard any news articles 114 having cumulative CTR metrics 334 that are less than 5% (e.g., the news article 114-1), which should eliminate a majority of the news articles 114 in which the user is likely to show little interest. It is noted that the foregoing approaches/rules can be fine-tuned to accommodate any operating environment, and can be dynamically adjusted to account for various observations, changes in news source/user behavior, and so on.

In any case, when the manager 112 establishes the second subset of the news articles 114, the manager 112 provides the second subset of the news articles 114 to the news reader 132. Next, in FIG. 3E, at step 350, the news reader 132 receives the second subset of the news articles 114, and displays them to the user (e.g., via a news feed within the news reader 132). As previously described above, the news reader 132 can be configured to observe the manner in which the user interacts with one or more of the news articles 114 included in the second subset of news articles 114. This can involve, for example, identifying impressions that occur when the news articles 114 are at least displayed to the user within the news reader 132. This can also involve identifying interactions made by the user with one or more of the news articles 114, e.g., clicking/touch-inputting to read the news article 114, saving the news article 114, liking the news article 114, sharing the news article 114, and so on. Additionally, the news reader 132 can be configured to identify other levels of detail associated with how the user interacts with one or more of the news articles 114. For example, the news reader 132 can identify lengths of time that the user spends reading the news articles 114, identify lengths of time that the user spends reading particular areas of news articles, and so on. For example, the news reader 132 can (1) identify when the user spends a considerable amount of time reviewing a specific section of a particular news articles 114, (2) identify at least one server cohort 116 associated with the specific section, and (3) correspondingly update the user CTR metric 136 that corresponds to the at least one server cohort 116. It is noted that the foregoing approaches can be fine-tuned to accommodate any operating environment, and can be dynamically adjusted to account for identifying any user behavior exhibited when reading news articles 114.

As shown in FIG. 3E, step 350 can involve the user interacting with the news article 114-2 included in the second subset of news articles 114. In particular, the news article 114-2 is (1) shown to the user, (2) read by the user, (3) shared by the user, and (4) liked by the user—but is not saved by the user. Again, it is noted that these interactions are merely exemplary, and that any number of observations—in any form—can be made with respect to the manner in which the user interacts with the news article 114-2. In any case, the values for each of the interaction types can contribute to updating the value for the user CTR metrics 136 that correspond to the server cohorts 116-2 (associated with the news article 114-2). For example, as shown in FIG. 3E, the user CTR metric 136 associated with the user cohort 134 "Aviation+Short Articles" can be updated from 15% to 18% in accordance with the observation of the user's interactions with the news article 114-2. Moreover, the user CTR metric 136 associated with the user cohort 134 "Politics+Videos" can be updated from 2% to 1.5% in accordance with the observation of the user's interactions with the news article 114-2. Moreover, the user CTR metric 136 associated with the user cohort 134 "Boeing+Images" can be updated from 30% to 32% in accordance with the observation of the user's interactions with the news article 114-2. Accordingly, at the conclusion of step 350, the user cohorts 134/user CTR metrics 136 have been updated (represented by the user cohorts 134'/user CTR metrics 136'), and reflect the user's interactions with the news article 114. Similar updates can be made to the user cohorts 134/user CTR metrics 136 in accordance with the user's interactions (or lack thereof) with other news articles 114 included in the second subset of news articles 114.

FIG. 3F illustrates an additional step that can take place when the foregoing updates are made to the user cohorts 134/user CTR metrics 136 for the user. In particular, at step 360, the news reader 132 can provide, to the manager 112, the updated user affinity information (i.e., user cohorts 134'/user CTR metrics 136') as user interaction feedback 150. It is noted that the news reader 132 can provide such an update on an individual basis, e.g., in response to the user interacting with one of the news articles 114 included in the second subset of news articles 114. Alternatively, the news reader 132 can provide cumulative updates that include information about various user interactions with the news articles 114 included in the first subset of news articles 114. In any case, the manager 112 can identify/access the news article 114-2 (e.g., in a database accessible to the manager 112), and update the server cohorts 116-2/server CTR metrics 118-2 associated with the news article 114-2 in accordance with the user cohorts 134'/user CTR metrics 136', to produce updated server cohorts 116-2'/server CTR metrics 118-2' for the news article 114-2.

For example, as shown in FIG. 3F, the server CTR metrics 118-2 that correspond to the server cohorts 116-2 "Aviation+Short Articles," "Politics+Videos," and "Boeing+Images" can be updated to new values based on the corresponding user cohorts 134'/user CTR metrics 136'. Again, it is noted that the manager 112 can be configured to perform any number/form of mathematical operations involving (1) the server cohorts 116-2/server CTR metrics 118-2, and (2) the user cohorts 134'/user CTR metrics 136'—and other metrics if desired—to produce the updated server cohorts 116-2'/server CTR metrics 118-2'. Additionally, and although not illustrated in FIG. 3F, it is noted that updating the server cohorts 116-2/server CTR metrics 118-2 can also involve removing one or more of the server cohorts 116-2 whose corresponding server CTR metrics 118-2 fall below a threshold level. This can occur, for example, when the news article 114-2 is inaccurately tagged with a server cohort 116-2 that has little or no relation to the content 120 of the news article 114-2—e.g., the server cohort 116-2 "Politics"—and results in a majority of the users who show strong affinities toward this server cohort 116-2 exhibiting little or no interaction toward the news article 114-2.

Figure 4A:
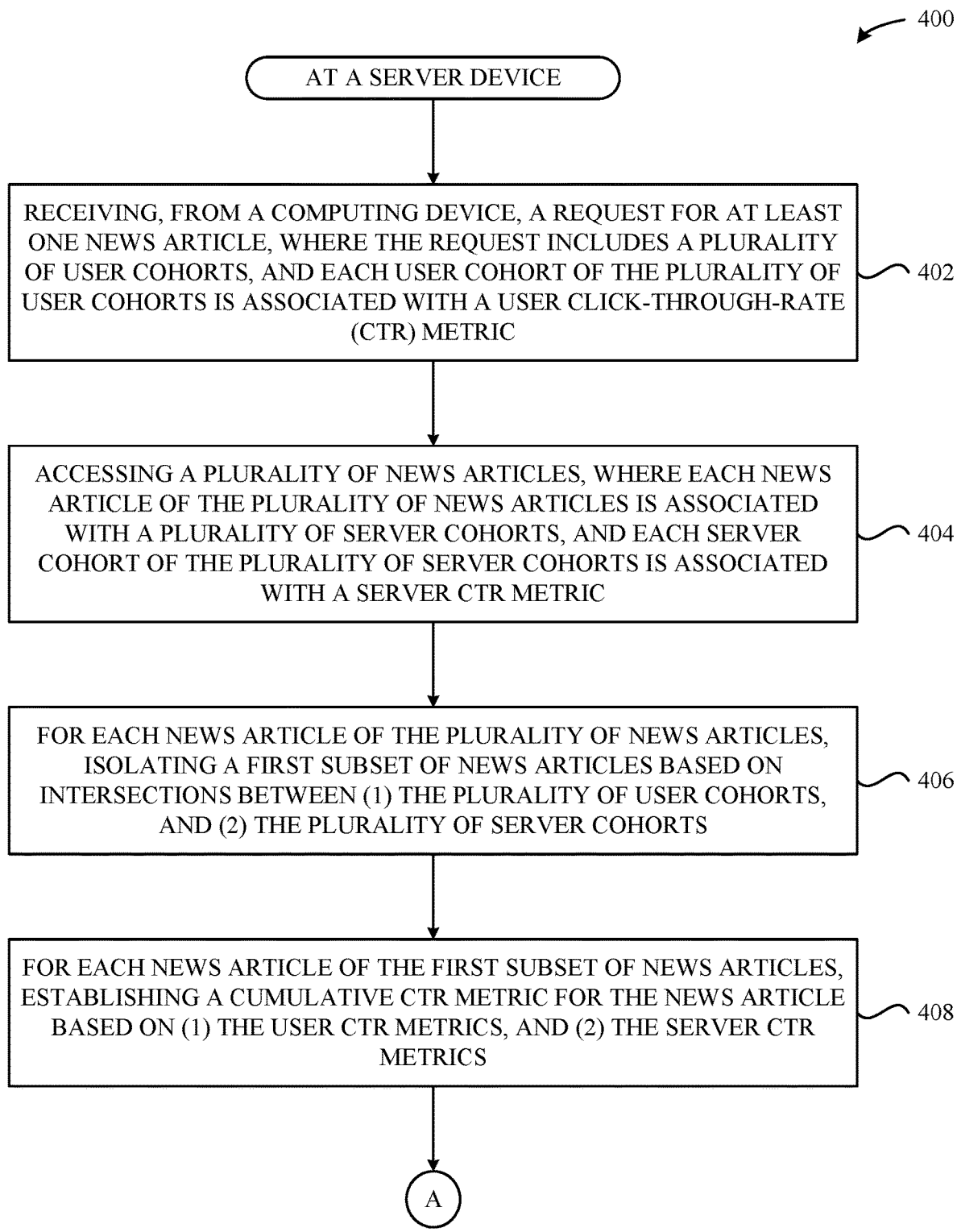
FIGS. 4A-4B illustrate a method implemented by the manager for delivering relevant news articles to news readers, according to some embodiments.
Figure 4B:
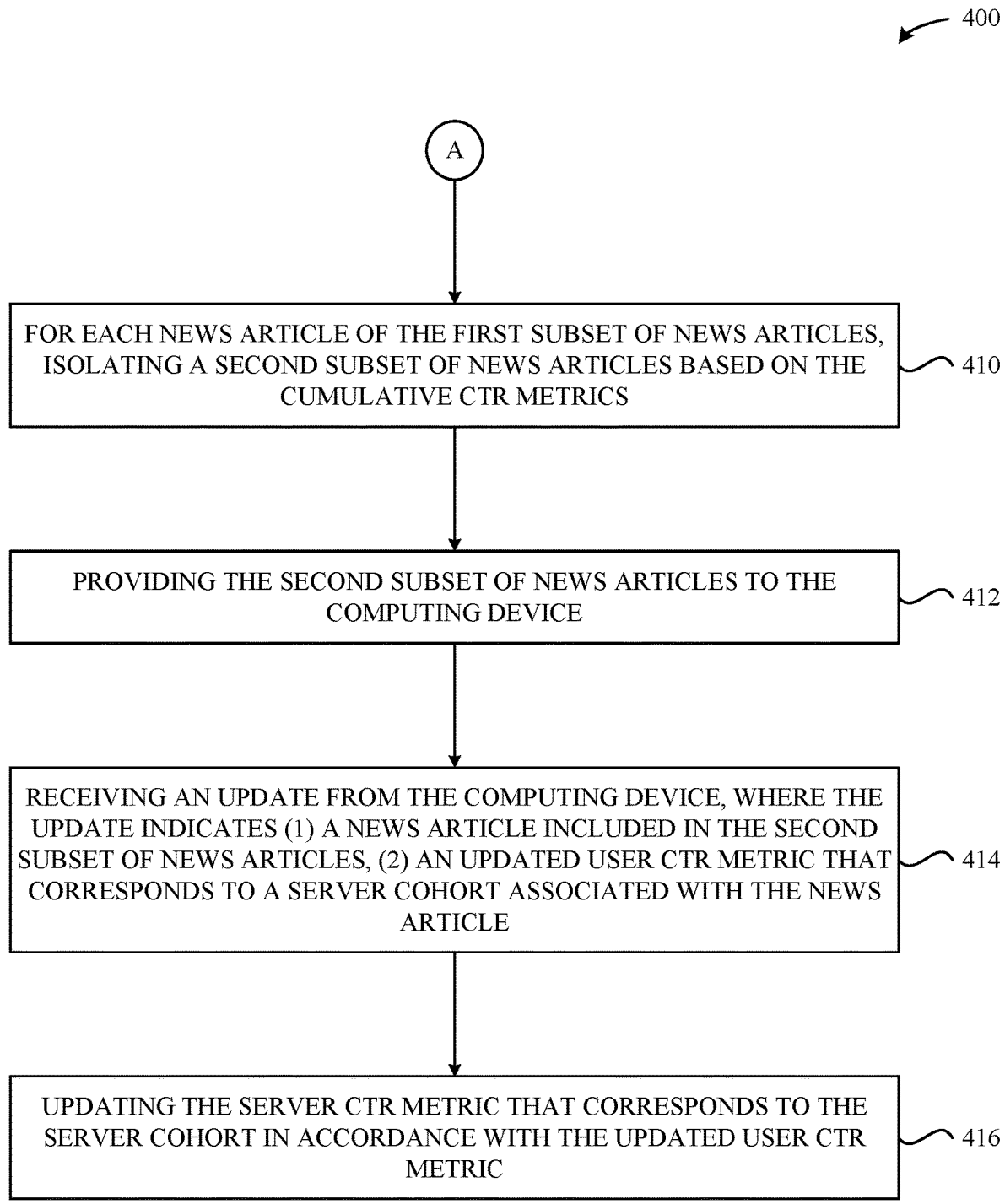

FIGS. 4A-4B illustrate a method 400 for delivering relevant news articles 114 to news readers 132, according to some embodiments. As shown in FIG. 4A, the method 400 begins at step 402, where the manager 112 receives, from a client computing device 130, a request for at least one news article 114, where the request includes a plurality of user cohorts 134, and each user cohort 134 of the plurality of user cohorts 134 is associated with a user CTR metric 136 (e.g., as described above in conjunction with FIG. 3A). At step 404, the manager 112 accesses a plurality of news articles 114, where each news article 114 of the plurality of news articles 114 is associated with a plurality of server cohorts 116, and each server cohort 116 of the plurality of server cohorts 116 is associated with a server CTR metric 118 (e.g., as described above in conjunction with FIG. 3B).

At step 406, the manager 112 isolates, for each news article 114 of the plurality of news articles 114, a first subset of news articles 114 based on intersections between (1) the plurality of user cohorts 134, and (2) the plurality of server cohorts 116 (e.g., as described above in conjunction with FIG. 3B). At step 408, the manager 112 establishes, for each news article 114 of the first subset of news articles 114, a cumulative CTR metric for the news article 114 based on (1) the user CTR metrics 136, and (2) the server CTR metrics 118 (e.g., as described above in conjunction with FIG. 3C). At step 410, the manager 112 isolates, for each news article 114 of the first subset of news articles 114, a second subset of news articles 114 based on the cumulative CTR metrics established at step 408 (e.g., as described above in conjunction with FIG. 3D). At step 412, the manager 112 provides the second subset of news articles 114 to the client computing device 130 (e.g., as also described above in conjunction with FIG. 3D).

At step 414, the manager 112 receives an update (e.g., user interaction feedback 150) from the client computing device 130, where the update indicates (1) a news article 114 included in the second subset of news articles 114, (2) an updated user CTR metric 136 that corresponds to a server cohort 116 (as well as the corresponding server CTR metric 118) associated with the news article 114 (e.g., as described above in conjunction with FIG. 3E-3F). At step 416, the manager 112 updates the server CTR metric 118 that corresponds to the server cohort 116 in accordance with the updated user CTR metric 136 (e.g., as described above in conjunction with FIG. 3F).

Figure 5:
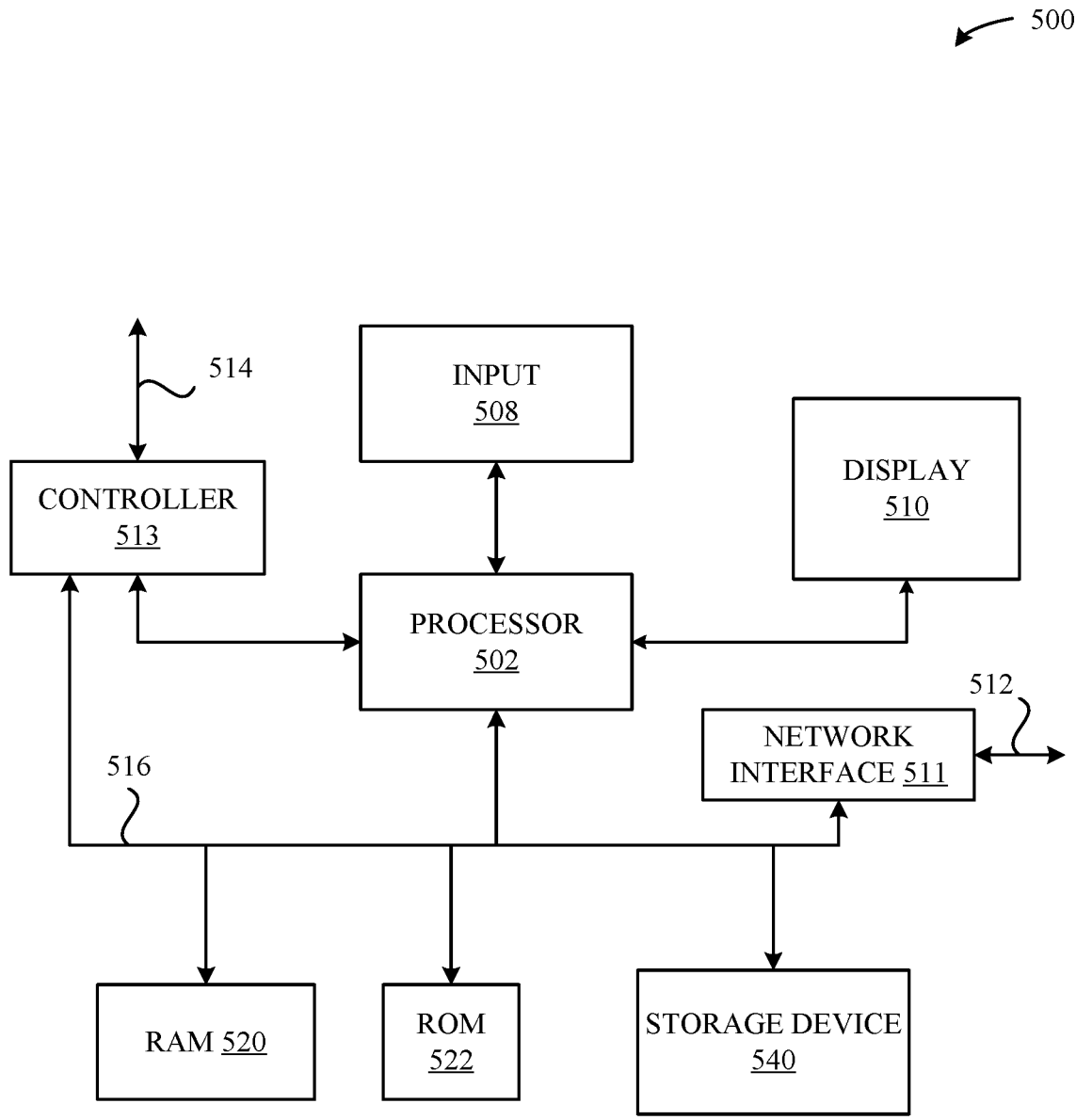
FIG. 5 illustrates a detailed view of a computing device that can represent the computing devices of FIG. 1 used to implement the various techniques described herein, according to some embodiments.

FIG. 5 illustrates a detailed view of a computing device 500 that can represent the computing devices of FIG. 1 used to implement the various techniques described herein, according to some embodiments. For example, the detailed view illustrates various components that can be included in the news source 102, the server computing device 110, and the client computing device 130 described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for delivering relevant news articles to users, the method comprising, at a server computing device:

receiving, from a client computing device associated with a user, a request for at least one news article, wherein the request includes a user affinity profile managed by the client computing device, and the user affinity profile specifies:

a plurality of user cohorts that represents interests of the user observed at least in part by the client computing device over time, and a respective user click-through-rate (CTR) metric for each user cohort of the plurality of user cohorts that represents a respective level of affinity the user exhibits for the user cohort;

accessing a plurality of news articles, wherein each news article of the plurality of news articles is associated with a plurality of server cohorts, and each server cohort of the plurality of server cohorts is associated with a respective server CTR metric;

for each news article of the plurality of news articles, isolating a first subset of news articles based on intersections between (1) the plurality of user cohorts, and (2) the plurality of server cohorts;

for each news article of the first subset of news articles, establishing a cumulative CTR metric for the news article based on (1) the user CTR metrics, and (2) the server CTR metrics;

for each news article of the first subset of news articles, isolating a second subset of news articles based on the cumulative CTR metrics;

providing the second subset of news articles to the client computing device;

receiving, from the client computing device:
  an indication of at least one news article in the second subset of news articles, and
  at least one updated user CTR metric that corresponds to a respective at least one server CTR metric associated with the at least one news article, wherein the at least one updated user CTR metric is generated by the client computing device based on interactions with the at least one news article by the user; and
updating the at least one server CTR metric based on the at least one updated user CTR metric to reflect whether the at least one server CTR metric was accurately or inaccurately linked to the at least one news article.

2. The method of claim 1, wherein, for each news article of the plurality of news articles, the associated plurality of server cohorts and their associated server CTR metrics are established using machine processing.

3. The method of claim 1, wherein, for a given user cohort of the plurality of user cohorts, the respective level of affinity represents a likelihood that the user will engage with a news article associated with the user cohort.

4. The method of claim 3, wherein the respective level of affinity is based on a number of times the user has encountered a news article that is associated with a server cohort that corresponds to the user cohort.

5. The method of claim 4, wherein the respective level of affinity is further based on whether the user has chosen to, upon encountering the news article: read the news article, save the news article, like the news article, and/or share the news article.

6. The method of claim 1, wherein the server CTR metric for a server cohort represents (1) a predicted interest for users that will receive a news article associated with the server cohort, and/or (2) a learned interest from users that have received the news article.

7. The method of claim 1, wherein establishing the cumulative CTR metric for a news article comprises, for each server cohort of the plurality of server cohorts that intersects with the plurality of user cohorts:
  applying the user CTR metric for the user cohort against the server CTR metric for the server cohort to produce an adjusted server CTR metric; and
  adding the adjusted server CTR metric to the cumulative CTR metric.

8. The method of claim 1, further comprising:
identifying the news articles in the second subset of news articles overlap beyond a pre-defined threshold; and
replacing at least one of the news articles in the second subset of news articles with a news article that does not overlap with the news articles in the second subset of news articles.

9. The method of claim 1, wherein at least one server CTR metric was accurately linked to the at least one news article when the user engages with the at least one news article and was inaccurately linked to the at least one news article when the user does not engage with the at least one news article.

10. At least one non-transitory computer readable storage medium configured to store instructions that, when executed by at least one processor included in a server computing device, cause the server computing device to deliver relevant news articles to users, by carrying out steps that include:
  receiving, from a client computing device associated with a user, a request for at least one news article, wherein the request includes a user affinity profile managed by the client computing device, and the user affinity profile specifies:
    a plurality of user cohorts that represents interests of the user observed at least in part by the client computing device over time, and
    a respective user click-through-rate (CTR) metric for each user cohort of the plurality of user cohorts that represents a respective level of affinity the user exhibits for the user cohort;
  accessing a plurality of news articles, wherein each news article of the plurality of news articles is associated with a plurality of server cohorts, and each server cohort of the plurality of server cohorts is associated with a respective server CTR metric;
  for each news article of the plurality of news articles, isolating a first subset of news articles based on intersections between (1) the plurality of user cohorts, and (2) the plurality of server cohorts;
  for each news article of the first subset of news articles, establishing a cumulative CTR metric for the news article based on (1) the user CTR metrics, and (2) the server CTR metrics;
  for each news article of the first subset of news articles, isolating a second subset of news articles based on the cumulative CTR metrics;
  providing the second subset of news articles to the client computing device;
  receiving, from the client computing device:
    an indication of at least one news article in the second subset of news articles, and
    at least one updated user CTR metric that corresponds to a respective at least one server CTR metric associated with the at least one news article, wherein the at least one updated user CTR metric is generated by the client computing device based on interactions with the at least one news article by the user; and
  updating the at least one server CTR metric based on the at least one updated user CTR metric to reflect whether the at least one server CTR metric was accurately or inaccurately linked to the at least one news article.

11. The at least one non-transitory computer readable storage medium of claim 10, wherein, for a given user cohort of the plurality of user cohorts, the respective level of affinity represents a likelihood that the user will engage with a news article associated with the user cohort.

12. The at least one non-transitory computer readable storage medium of claim 10, wherein the server CTR metric for a server cohort represents (1) a predicted interest for users that will receive a news article associated with the server cohort, and/or (2) a learned interest from users that have received the news article.

13. The at least one non-transitory computer readable storage medium of claim 10, wherein establishing the cumulative CTR metric for a news article comprises, for each server cohort of the plurality of server cohorts that intersects with the plurality of user cohorts:
  applying the user CTR metric for the user cohort against the server CTR metric for the server cohort to produce an adjusted server CTR metric; and
  adding the adjusted server CTR metric to the cumulative CTR metric.

14. The at least one non-transitory computer readable storage medium of claim 10, wherein the steps further include:
  identifying the news articles in the second subset of news articles overlap beyond a pre-defined threshold; and replacing at least one of the news articles in the second subset of news articles with a news article that does not overlap with the news articles in the second subset of news articles.

15. The at least one non-transitory computer readable storage medium of claim 10, wherein at least one server CTR metric was accurately linked to the at least one news article when the user engages with the at least one news article and was inaccurately linked to the at least one news article when the user does not engage with the at least one news article.

16. A server computing device configured to deliver relevant news articles to users, the server computing device comprising:
at least one processor; and
at least one memory configured to store instructions that, when executed by the at least one processor, cause the server computing device to:
receive, from a client computing device associated with a user, a request for at least one news article, wherein the request includes a user affinity profile managed by the client computing device, and the user affinity profile specifies:
a plurality of user cohorts that represents interests of the user observed at least in part by the client computing device over time, and
a respective user click-through-rate (CTR) metric for each user cohort of the plurality of user cohorts that represents a respective level of affinity the user exhibits for the user cohort;
access a plurality of news articles, wherein each news article of the plurality of news articles is associated with a plurality of server cohorts, and each server cohort of the plurality of server cohorts is associated with a respective server CTR metric;
for each news article of the plurality of news articles, isolate a first subset of news articles based on intersections between (1) the plurality of user cohorts, and (2) the plurality of server cohorts;
for each news article of the first subset of news articles, establish a cumulative CTR metric for the news article based on (1) the user CTR metrics, and (2) the server CTR metrics;
for each news article of the first subset of news articles, isolate a second subset of news articles based on the cumulative CTR metrics;
provide the second subset of news articles to the client computing device;
receive, from the client computing device:
an indication of at least one news article in the second subset of news articles, and
at least one updated user CTR metric that corresponds to a respective at least one server CTR metric associated with the at least one news article, wherein the at least one updated user CTR metric is generated by the client computing device based on interactions with the at least one news article by the user; and
update the at least one server CTR metric based on the at least one updated user CTR metric to reflect whether the at least one server CTR metric was accurately or inaccurately linked to the at least one news article.

17. The server computing device of claim 16, wherein, for a given user cohort of the plurality of user cohorts, the respective level of affinity represents a likelihood that the user will engage with a news article associated with the user cohort.

18. The server computing device of claim 16, wherein the server CTR metric for a server cohort represents (1) a predicted interest for users that will receive a news article associated with the server cohort, and/or (2) a learned interest from users that have received the news article.

19. The server computing device of claim 16, wherein establishing the cumulative CTR metric for a news article comprises, for each server cohort of the plurality of server cohorts that intersects with the plurality of user cohorts:
applying the user CTR metric for the user cohort against the server CTR metric for the server cohort to produce an adjusted server CTR metric; and
adding the adjusted server CTR metric to the cumulative CTR metric.

20. The server computing device of claim 16, wherein at least one server CTR metric was accurately linked to the at least one news article when the user engages with the at least one news article and was inaccurately linked to the at least one news article when the user does not engage with the at least one news article.

* * * * *